(12) United States Patent
Johnson

(10) Patent No.: US 10,339,515 B1
(45) Date of Patent: Jul. 2, 2019

(54) SHOPPING CART WITH INTEGRATED SCALE AND POINT OF SALE DEVICE

(71) Applicant: Maurice D. Johnson, Battle Creek, MI (US)

(72) Inventor: Maurice D. Johnson, Battle Creek, MI (US)

( * ) Notice: Subject to any disclaimer, the term of this patent is extended or adjusted under 35 U.S.C. 154(b) by 435 days.

(21) Appl. No.: 15/215,149

(22) Filed: Jul. 20, 2016

Related U.S. Application Data

(60) Provisional application No. 62/194,595, filed on Jul. 20, 2015.

(51) Int. Cl.
| | |
|---|---|
| *G06Q 20/20* | (2012.01) |
| *G06K 7/08* | (2006.01) |
| *G06K 7/14* | (2006.01) |
| *B62B 3/14* | (2006.01) |

(52) U.S. Cl.
CPC ......... *G06Q 20/208* (2013.01); *B62B 3/1416* (2013.01); *B62B 3/1424* (2013.01); *G06K 7/087* (2013.01); *G06K 7/1413* (2013.01)

(58) Field of Classification Search
CPC ........ G06Q 20/12; G06Q 30/00; G06Q 99/00; G06Q 20/20; G06K 15/00; G06K 17/00
USPC .... 235/383, 385, 375, 431, 432; 705/23, 17, 705/26.8, 14.23
See application file for complete search history.

(56) References Cited

U.S. PATENT DOCUMENTS

| | | | | |
|---|---|---|---|---|
| 4,071,740 A | * | 1/1978 | Gogulski | G06K 7/10861 235/431 |
| 4,929,819 A | | 5/1990 | Collins, Jr. | |
| 5,064,012 A | * | 11/1991 | Losego | B62B 5/0026 180/19.1 |
| 5,250,789 A | * | 10/1993 | Johnsen | B62B 3/142 235/383 |
| 5,418,354 A | | 3/1995 | Hailing | |
| 6,435,407 B1 | * | 8/2002 | Fiordelisi | A47F 9/045 235/383 |
| 6,484,939 B1 | * | 11/2002 | Blaeuer | B62B 3/1416 235/380 |
| 6,595,417 B2 | * | 7/2003 | O'Hagan | G06K 7/0004 235/383 |
| 6,910,697 B2 | * | 6/2005 | Varatharajah | B62B 3/14 235/383 |
| 6,928,343 B2 | * | 8/2005 | Cato | G06Q 10/0875 340/5.91 |
| 6,997,382 B1 | | 2/2006 | Bhri | |
| 7,107,221 B1 | * | 9/2006 | Tracy | G06Q 20/20 705/26.81 |
| 7,168,525 B1 | * | 1/2007 | Jacobs | G06Q 20/203 186/61 |
| 7,845,554 B2 | * | 12/2010 | Jacobs | G07G 1/01 235/383 |
| 7,953,606 B2 | * | 5/2011 | Shirasaki | G06Q 20/204 280/33.991 |

(Continued)

*Primary Examiner* — Olusegun Goyea
(74) *Attorney, Agent, or Firm* — Cramer Patent & Design, PLLC; Aaron R. Cramer

(57) ABSTRACT

A shopping cart has integrated scale and point-of-sale device. The scale and credit card processing device are secured within a common housing. The bar code reader is secured within a hand wand which is detachably secured to the exterior of the scale and credit card processing device's housing. The scale and credit card processing device are secured to top center of the shopping cart's handle.

8 Claims, 3 Drawing Sheets

(56) References Cited

U.S. PATENT DOCUMENTS

| | | | | |
|---|---|---|---|---|
| 8,120,190 B2* | 2/2012 | Bravo | H02J 17/00 290/1 R | |
| 8,152,062 B2* | 4/2012 | Perrier | B62B 3/1416 235/383 | |
| 8,464,945 B2* | 6/2013 | Connelly | B62B 3/148 235/375 | |
| 9,292,853 B2* | 3/2016 | Ascarrunz | G07G 1/0081 | |
| 2002/0145038 A1* | 10/2002 | O'Hagan | G06K 7/0004 235/383 | |
| 2002/0194074 A1* | 12/2002 | Jacobs | G07G 1/01 705/16 | |
| 2004/0238629 A1* | 12/2004 | Buchholz | G06K 7/10861 235/383 | |
| 2004/0249717 A1* | 12/2004 | Shirasaki | G06Q 20/204 705/17 | |
| 2005/0230472 A1* | 10/2005 | Chang | G06Q 20/343 235/383 | |
| 2006/0190340 A1* | 8/2006 | Myskowski | G06Q 10/087 705/14.4 | |
| 2010/0078903 A1* | 4/2010 | Bravo | H02J 17/00 280/33.992 | |
| 2012/0296751 A1* | 11/2012 | Napper | G06Q 20/208 705/23 | |
| 2013/0080719 A1* | 3/2013 | Connelly | B62B 3/148 711/154 | |
| 2014/0001258 A1* | 1/2014 | Chan | G06Q 10/0875 235/385 | |
| 2014/0214577 A1* | 7/2014 | Acker, Jr. | G07G 1/0081 705/23 | |
| 2014/0214596 A1* | 7/2014 | Acker, Jr. | G06Q 30/0633 705/26.8 | |
| 2017/0158215 A1* | 6/2017 | Phillips | B62B 5/0096 | |

* cited by examiner

SHOPPING CART WITH INTEGRATED SCALE AND POINT OF SALE DEVICE

RELATED APPLICATIONS

The present invention was first described in and claims the benefit of U.S. Provisional Application No. 62/194,595 filed Jul. 20, 2015, the entire disclosures of which are incorporated herein by reference.

FIELD OF THE INVENTION

The present invention relates to a shopping cart with integrated scale and point-of-sale device.

BACKGROUND OF THE INVENTION

With the advent of Universal Product Code (UPC) symbols, barcode scanners, and automated self-service checkouts, many stores such as grocery and discount stores have stopped putting clearly visible pricing information on each product. This allows such stores to save time while stocking shelves and ringing out customers while allowing for instantaneous price adjustments for sales and the like.

While this technology has saved the stores time and money, it has placed the consumer at a disadvantage. Even if the product is displayed at the proper location within the store, the consumer is not sure of the correct price or sale price. Additionally, when checking out, the purchaser must remove all of the items from the cart, have each item scanned by a store employee or him or herself, and then place the items back in the cart. This not only takes a significant amount of time, but checkout registers also occupy valuable store floor space that could be used to hold additional stock for purchase and thereby increase store revenues.

Additionally, many people have a budget to stick to when purchasing certain products. As a result, this may necessitate having to remove certain items from the cart at the checkout when the prices are not accurately known when originally placed into the cart, not only wasting time of the cashier, but increasing aggravation for those waiting in line. Accordingly, there exists a need for a means by which a shopper can be provided with a trouble free checkout experience that addresses the issues described above. The development of the present device fulfills this need.

SUMMARY OF THE INVENTION

The inventor has recognized the aforementioned inherent problems and lack in the art and observed that there is a need for a shopping cart with integrated scale and point-of-sale device.

It is therefore an object of the invention to provide an item purchasing system, comprising a shopping cart which has an upper frame. The upper frame has a basket which has an open top, a first side, a second side, a third side, a fourth side and a bottom side which define an interior and a child carrier which is secured within the basket and adjacent to the first side. The shopping cart also has a handlebar which is located adjacent to the exterior top portion of the first side of the basket while being opposite the child carrier, a holder which is secured to the handlebar, a lower frame which is attached subjacent to the bottom side of the basket and a plurality of wheels which each are attached subjacent to the lower frame. In a separate embodiment, the shopping cart is not provided resulting in the holder being capable of being secured to a handlebar of a shopping cart, the scale being capable of being secured within a basket of the shopping cart, a scanning device which is capable of being supported within the holder and a control module, which is capable of being secured to the shopping cart.

The purchasing system also comprises a scale which is secured within the basket and is superjacent to the bottom side of the basket, a scanning device which is capable of being supported within the holder and a control module which is secured to the shopping cart and is in wireless communication with the scanning device and the scale. The control module comprises a housing attachable to the handlebar which has an interior, a control module power source, a microprocessor which is housed within the interior and in electrical communication with the control module power source and capable of being programmed, a first display which is located on a front face of the housing and is in electrical communication with the microprocessor, a second display which is located on a front face of the housing and is in electrical communication with the microprocessor, a first transceiver which is in electrical communication with the microprocessor and a first antenna which is in electrical communication with the microprocessor.

The scale is capable of generating and transmitting weight data regarding a weight of any item placed thereon to the microprocessor. The scanning device is capable of generating and transmitting UPC data when reading a UPC code that has been scanned to the microprocessor. The first display and the second display are capable of displaying the weight data from the scale in a manner visible to a user of the system. The first display and the second display are capable of displaying the UPC data. The weight data and the UPC data are capable of being transmitted from the first transceiver to a database. The first transceiver is capable of receiving return data from the database that corresponds to the weight data or the UPC data. The microprocessor is capable of generating a list of the return data received from the database while either the first display or the second display displays the return data.

The scale may further comprise a scale power source, a first auxiliary microprocessor in electrical communication with the scale power source, a weight sensor in electrical communication with the first auxiliary microprocessor, a second transceiver in electrical communication with the first auxiliary microprocessor and a second antenna in electrical communication with the second transceiver. The weight data from the weight sensor is transmitted via the second antenna to the first antenna of the control module.

The scanning device may further comprise a scanning device power source, a second auxiliary microprocessor in electrical communication with the scanning device source, a barcode scanner in electrical communication with the second auxiliary microprocessor, a third transceiver in electrical communication with the second auxiliary microprocessor and a third antenna in electrical communication with the third transceiver. The UPC data is transmitted via the third antenna to the first antenna of the control module.

The first display may further comprise a scan button, which provides selective activation of the scanning device to generate and transmit the UPC data to the microprocessor, an add button, which provides selective addition of any item to the list, a remove button, which provides selective removal of any item from the list, a coupon button, which provides selective addition of the scanning device to generate and transmit the coupon UPC data to the microprocessor, a complete button, which provides selective compiling of the list and sends the list data to the microprocessor and a home button, which provides selective scrolling through various display screen outputs of the first display.

The control module may further comprise a magnetic card reader which is in electrical communication with the microprocessor. In this configuration, the complete button provides selective activation of the magnetic card reader. Additionally, the control module may further comprise a printer which is located within the housing and in electrical communication with the microprocessor. Under this configuration, the complete button provides selective activation of the printer and which in turn is capable of printing out the list data.

The first display may further comprise a current item description field which is superjacent to the coupon button and displays a description of any item scanned by the scanning device upon activation of the scan button, a current item cost field which is subjacent the current item description field and which is superjacent the coupon button and displays cost data of any item scanned by the scanning device upon activation of the scan button, a current item weight field which is subjacent to the current item cost field and which is superjacent to the coupon button and displays weight data from any item placed upon the scale, a total coupon field which is subjacent the current item weight field and which is superjacent the coupon button and displays total value of any coupons added via the coupon button and a total bill field which is subjacent the total coupon field and which is superjacent the coupon button and displays total cost of any items on the list.

The second display may also display a price and name of an item either scanned or weighed. The control module, scale, and scanning device power sources may each comprise of rechargeable batteries.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
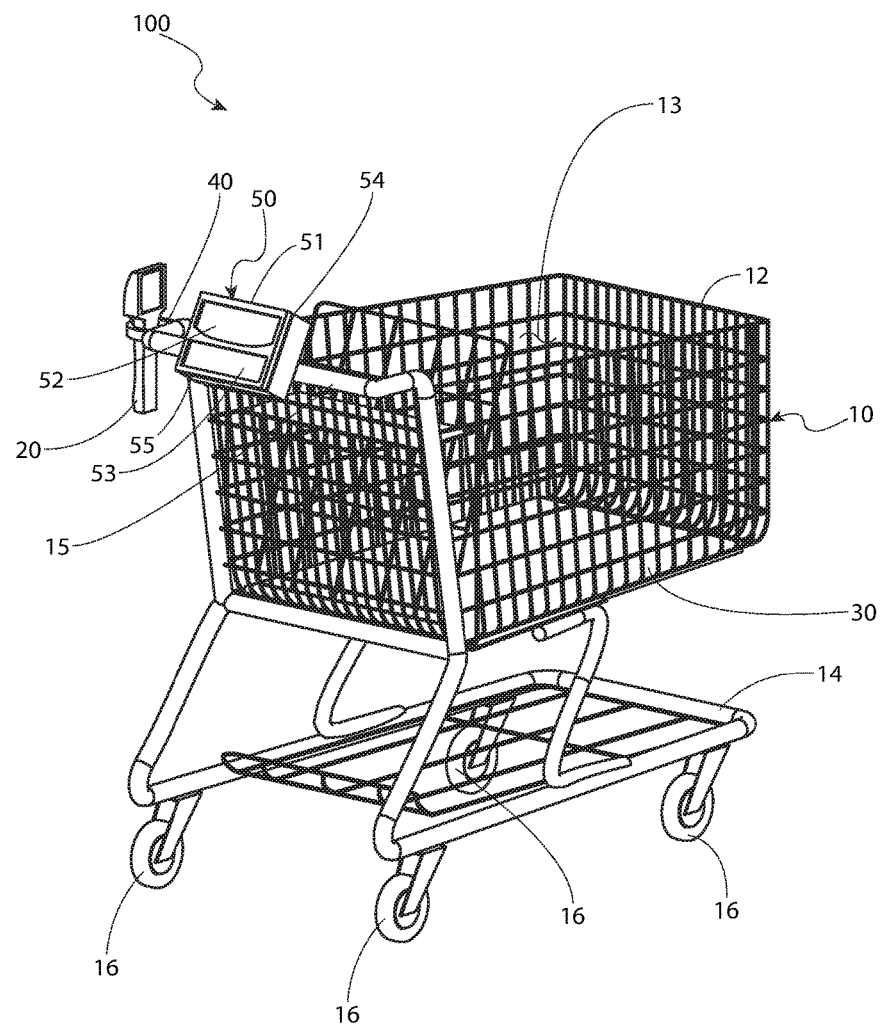
FIG. 1 is a perspective view of a shopping cart 10 having an integral scale 30 and control module 50, according to an embodiment of the present invention.

DESCRIPTIVE KEY 10 shopping cart
11 child carrier
12 upper frame
13 basket
14 lower frame
15 handlebar
16 wheel
20 scanning device
30 scale
40 scanning device holder
50 control module
51 housing
52 first display
53 second display
54 magnetic card reader
55 printer
100 shopping cart with integrated scale and point-of-sale device
105 current item description field
110 current item cost field
115 current item weight field
120 total coupon field
125 total bill field
130 scan button
135 add button
140 remove button
145 coupon button
150 complete button
155 home button
200 main central processor
205 first rechargeable battery
210 first transceiver
215 first antenna
220 radio frequency (RF) waves
225 first auxiliary processor
230 weight sensor
235 second rechargeable battery
240 second transceiver
245 second antenna
250 second auxiliary processor
255 barcode scanner
260 third rechargeable battery
265 third transceiver
270 third antenna
275 central database
280 fourth antenna

DETAILED DESCRIPTION OF THE PREFERRED EMBODIMENT

Referring now to FIG. 1, a perspective view of the shopping cart with integrated scale and point-of-sale device (herein described as the "device") 100 is disclosed. A shopping cart 10 with an integrated UPC scanning device 20 is utilized with a weight verification system housed within a control module 50 attached to the shopping cart 10, a magnetic card reader 54, and associated electronics allowing for shopper-controlled direct purchasing.

The shopping cart 10 is fashioned as a conventional shopping cart 10, having an upper frame 12 defining a basket 13 for carrying contents therein and a child carrier 11, a handlebar 15 located at a front of the upper frame 12 by the child carrier 11, a lower frame 14 attached to the upper frame 12, and a plurality of wheels 16 attached to the lower frame 13 for transporting the shopping cart 10 and contents.

The control module 50 incorporates a small plastic enclosure 21 and is attached at the front of the shopping cart 10, preferably either on the handlebar 15 or immediately behind the child carrier 11. A bar code scanning device 20 is capable of being removably held within a scanning device holder 40 preferably located as an extension of the handlebar 15. The scanning device 20 is capable of reading the UPC product code on all products. The scanning device 20 is configured to be in wireless communication with the control module 50 containing the database of all store prices, sales, discounts and the like. The price and name of the item, which is stored in the control module 50, will be displayed on either one (1) of the first display 52 or second display 53 of the housing 51. When the price is returned, the user has the option of automatically adding the price to the memory of the control module 50 and placing the item in the basket 13 of the shopping cart 10 or returning it to the shelf and not purchasing it. The basket 13 of the shopping cart 10 has an integrated scale 30 that keeps track of items placed in the basket 13 via wireless communication with the control module 50, thus preventing items from being added if they are not scanned first. The user also has the option of removing an item from the basket 13 and subtracting it from the running total at a later time if needed as well. When finished shopping, the user can pay for their purchases with an integrated magnetic card reader 54. A receipt is then printed for exit verification. The user may also pay with cash at the exit as well if desired. It is envisioned that the scanning device 20, scale 30, and control module 50 would be powered by a suitably sized battery pack that would allow for continuous operation during store hours and capable of being recharged at night. This provides shopper with convenience, information, and time savings while providing store owners with increased revenue, reduced overhead, and enhanced store control in a manner which is quick, easy, and effective.

A printer 55 is also provided with the control module 50. The printer 55 is capable of printing out a total itemized list of all the items within the shopping cart basket 13 and the total weight of all the items as weighed by the scale 20 and scanned by the scanning device 20. The user then can present the receipt to a worker at the store and pay directly then (upon confirmation) or with the magnetic card reader 54.

Figure 2:
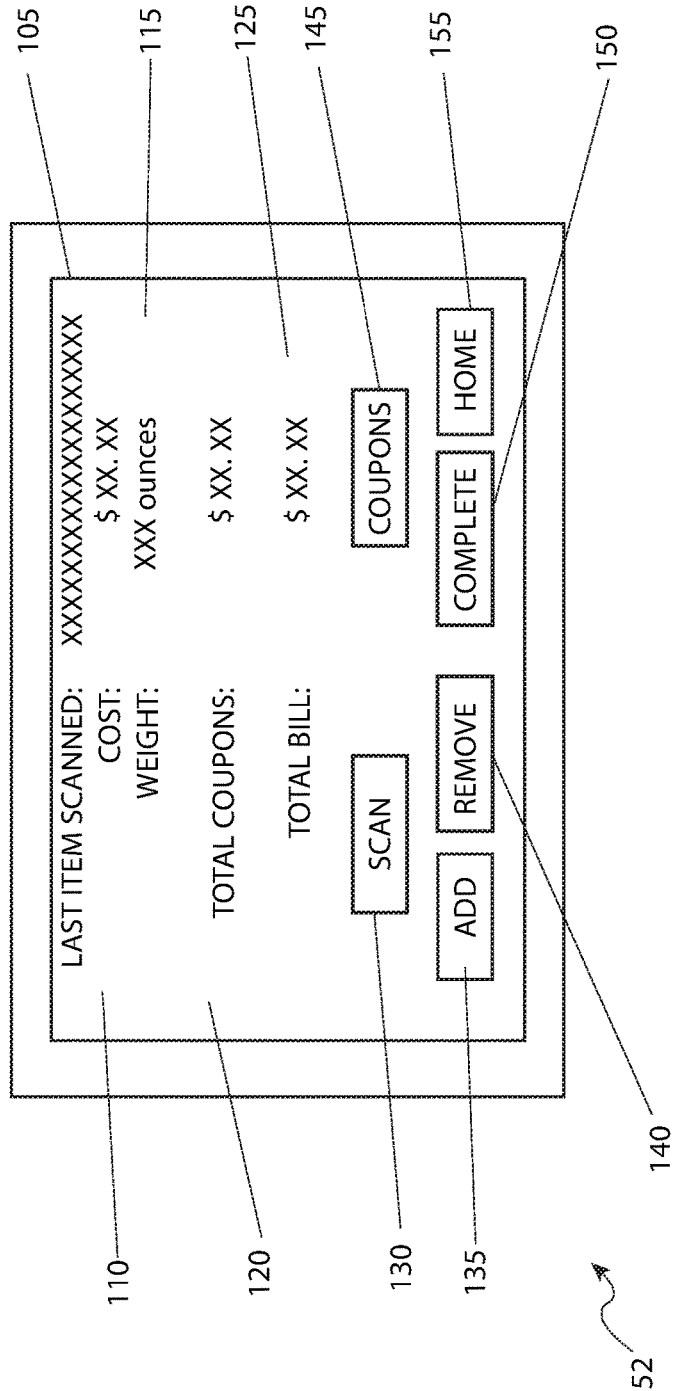
FIG. 2 is a detailed view of the first display 52, as used on the shopping cart with integrated scale and point-of-sale device 100, according to the preferred embodiment of the present invention; and, FIG. 3 is an electrical block diagram depicting the major electrical components of the shopping cart with integrated scale and point-of-sale device 100, according to the preferred embodiment of the present invention.

Referring next to FIG. 2, a detailed view of the first display 52, as used on the device 100, according to the preferred embodiment of the present invention is depicted. Said first display 52 is envisioned to be of the touch screen sensitive backlit liquid crystal display (LCD) type. The first display 52 would be provided with a plurality of different screen displays based upon current mode of operation. The version displayed in FIG. 2 is intended as a representative display and is not intended to be a limiting factor of the present invention. The first display 52 provides a current item description field 105 for providing the shopper information about the current purchased item. A current item cost field 110 provides the cost of the current purchased item. A current item cost field 115 provides information about the weight of the current item should it be applicable. A cost per weight field could also be provided to provide the ability to compare two or more different items of the same type. A total coupon field 120 allows the shopper to keep track of total coupons that have been scanned in by the UPC code. Said coupons would be surrendered by the shopper to a store employee for verification upon checkout. Total purchase price of the contents of the device 100 is provided by a total bill field 125 to allow the shopper to remain within a budget and remove items if necessary.

A plurality of touch screen buttons is also provided on the first display 52. A scan button 130 allows the shopper to scan an item to display pertinent information on the first display 52. Should the shopper wish to purchase said item, an add button 135 is pressed. If the shopper does not wish to purchase said item, it simply returned to the shelf. A remove button 140 allows the shopper to remove a previously purchased item from the device 100 should the shopper change their mind about a previously added item before checking out from the store. A coupon button 145 allows the user to scan coupons for applicable items to reduce the total cost. Said coupons would be surrendered by the shopper to a store employee for verification upon checkout, as aforementioned described. A complete button 150 would complete the shopping experience allowing the shopper to print receipts, pay for purchases via credit, debit, or Electronic Benefit Transfer (EBT) card using the magnetic card reader 54 (as shown in FIG. 1) and perform other shopping termination processes. Finally, a home button 155 allows the shopper to change among various display screen outputs of the first display 52.

Figure 3:
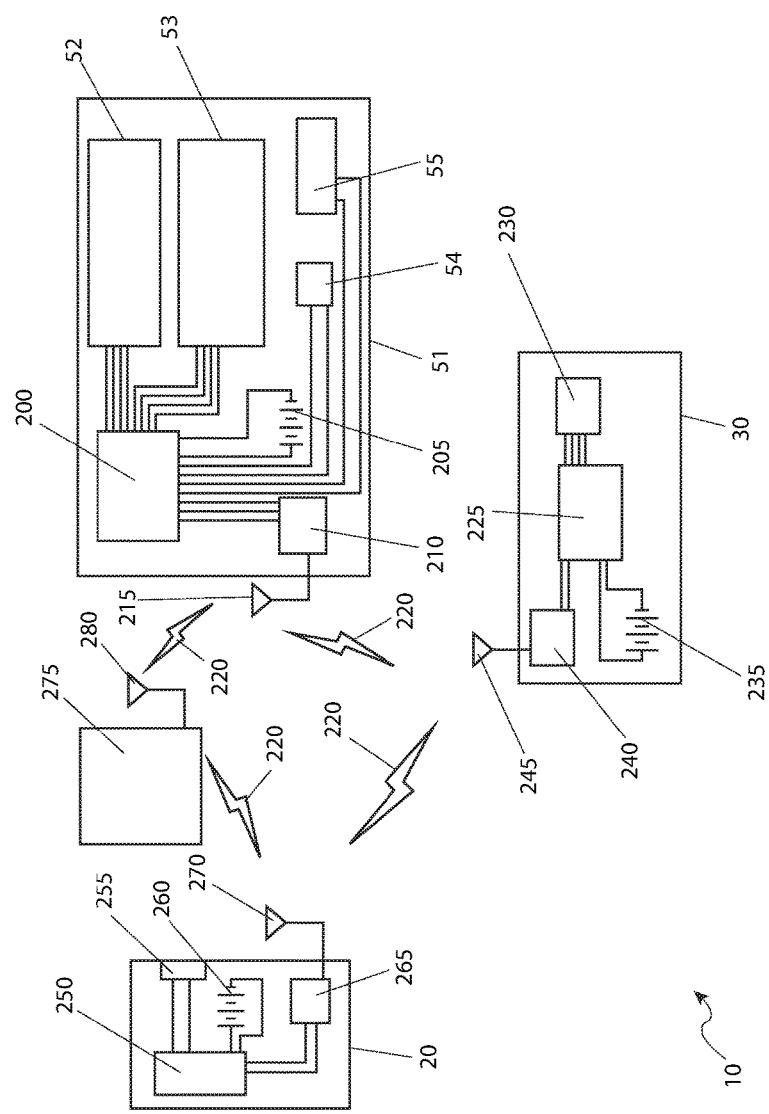

Referring finally to FIG. 3, an electrical block diagram depicting the major electrical components of the device 100, according to the preferred embodiment of the present invention is shown. A main central processor 200 is located inside of the housing 51. It provides output signals to the first display 52, the second display 53, the magnetic card reader 54 and the printer 55. It receives power from a first rechargeable battery 205 and communicates with other devices in the device 100 via a first transceiver 210 through a first antenna 215 using radio frequency (RF) waves 220.

The scale 30 utilizes a first auxiliary processor 225 to perform processing functions. A weight sensor 230 provides input signals and a second rechargeable battery 235 provides electrical power. Sine there are no local user output signals, the first auxiliary processor 225 provides all communication data to the device 100 to a second transceiver 240 through a second antenna 245.

The scanning device 20 utilizes a second auxiliary processor 250 to perform processing functions. A barcode scanner 255 provides input signals and a third rechargeable battery 260 provides electrical power. Since there are no local user output signals, the second auxiliary processor 250 provides all communication data to the device 100 to a third transceiver 265 through a third antenna 270.

All current pricing information is maintained in a central database 275, envisioned to be maintained at a local store level. Additional information regarding inventory, sales, promotions, coupons, taxes, and the like would also be accessible through the central database 275 as well. Data transfer to and from the central database 275 would be accomplished through a fourth antenna 280 using radio frequency (RF) waves 220.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An item purchasing system, comprising:
    a holder capable of being secured to a handlebar of a shopping cart;
    a scale capable of being secured within a basket of said shopping cart;
    a scanning device, capable of being supported within said holder; and,
    a control module, capable of being secured to said shopping cart and in wireless communication with said scanning device and said scale, comprising:
        a housing attachable to said handlebar having an interior;
        a first power source;

a microprocessor housed within said interior in electrical communication with said first power source and capable of being programmed;
a first display located on a front face of said housing in electrical communication with said microprocessor;
a second display located on a front face of said housing in electrical communication with said microprocessor;
a first transceiver in electrical communication with said microprocessor; and,
a first antenna in electrical communication with said microprocessor;
wherein said scale is capable of generating and transmitting weight data regarding a weight of any item placed thereon to said microprocessor;
wherein said scanning device is capable of generating and transmitting UPC data when reading a UPC code that has been scanned to said microprocessor;
wherein said first display and said second display are capable of displaying said weight data from said scale in a manner visible to a user of said system;
wherein said first display and said second display are capable of displaying said UPC data;
wherein said weight data and said UPC data are capable of being transmitted from said first transceiver to a database;
wherein said first transceiver is capable of receiving return data from said database that corresponds to said weight data or said UPC data;
wherein said microprocessor is capable of generating a list of said return data received from said database;
wherein either said first display or said second display displays said return data;
wherein said scale further comprises:
  a scale power source;
  a first auxiliary microprocessor in electrical communication with said scale power source;
  a weight sensor in electrical communication with said first auxiliary microprocessor;
  a second transceiver in electrical communication with said first auxiliary microprocessor;
  a second antenna in electrical communication with said second transceiver;
  wherein said weight data from said weight sensor is transmitted via said second antenna to said first antenna of said control module;
wherein said first display further comprises:
  a scan button, providing selective activation of said scanning device to generate and transmit said UPC data to said microprocessor;
  an add button, providing selective addition of any item to said list:
  a remove button, providing selective removal of any item from said list;
  a coupon button, providing selective addition of said scanning device to generate and transmit said coupon UPC data to said microprocessor;
  a complete button, providing selective compiling of said list and sends said list data to said microprocessor;
  a home button, providing selective scrolling through various display screen outputs of said first display; and
wherein said control module further comprises a printer located within said housing and in electrical communication with said microprocessor;
wherein said complete button provides selective activation of said printer; and,
wherein said printer is capable of printing out said list data.

2. The system of claim 1, wherein said scanning device further comprises:
  a scanning device power source;
  a second auxiliary microprocessor in electrical communication with said scanning device source;
  a barcode scanner in electrical communication with said second auxiliary microprocessor;
  a third transceiver in electrical communication with said second auxiliary microprocessor; and,
  a third antenna in electrical communication with said third transceiver;
  wherein said UPC data is transmitted via said third antenna to said first antenna of said control module.

3. The system of claim 1, wherein said control module further comprises a magnetic card reader which is in electrical communication with said microprocessor;
  wherein said complete button provides selective activation of said magnetic card reader.

4. The system of claim 1, wherein said first display further comprises:
  a current item description field superjacent to said coupon button which displays a description of any item scanned by said scanning device upon activation of said scan button;
  a current item cost field subjacent said current item description field and superjacent said coupon button which displays cost data of any item scanned by said scanning device upon activation of said scan button;
  a current item weight field subjacent said current item cost field and superjacent said coupon button which displays weight data from any item placed upon said scale;
  a total coupon field subjacent said current item weight field and superjacent said coupon button which displays total value of any coupons added via said coupon button; and,
  a total bill field subjacent said total coupon field and superjacent said coupon button which displays total cost of any items on said list.

5. The system of claim 1, wherein said second display displays a price and name of an item either scanned or weighed.

6. The system of claim 1, wherein said control module power source comprises rechargeable batteries.

7. The system of claim 1, wherein said scale power source comprises rechargeable batteries.

8. The system of claim 1, wherein said scanning device power source comprises rechargeable batteries.

* * * * *